No. 723,979. PATENTED MAR. 31, 1903.
L. R. BLACKMORE.
REFRIGERATOR.
APPLICATION FILED MAR. 22, 1902.
NO MODEL. 6 SHEETS—SHEET 1.

Attest:
Lo. Lee.
Walter H. Talmage.

Inventor.
Lawrence R. Blackmore,
per Thos. S. Crane, Atty.

No. 723,979. PATENTED MAR. 31, 1903.
L. R. BLACKMORE.
REFRIGERATOR.
APPLICATION FILED MAR. 22, 1902.
NO MODEL. 6 SHEETS—SHEET 2.

Attest:
L. Lee.
Walter H. Talmage.

Inventor.
Lawrence R. Blackmore,
per Thos. S. Crane, Atty.

No. 723,979. PATENTED MAR. 31, 1903.
L. R. BLACKMORE.
REFRIGERATOR.
APPLICATION FILED MAR. 22, 1902.
NO MODEL. 6 SHEETS—SHEET 3.

No. 723,979. PATENTED MAR. 31, 1903.
L. R. BLACKMORE.
REFRIGERATOR.
APPLICATION FILED MAR. 22, 1902.
NO MODEL. 6 SHEETS—SHEET 4.

Attest:
L. Lee.
Walter H. Talmage.

Inventor.
Lawrence R. Blackmore,
per Theo. S. Crane, Atty.

No. 723,979. PATENTED MAR. 31, 1903.
L. R. BLACKMORE.
REFRIGERATOR.
APPLICATION FILED MAR. 22, 1902.
NO MODEL. 6 SHEETS—SHEET 5.

Attest:
L. Lee,
Walter H. Talmage.

Inventor.
Lawrence R. Blackmore,
per Thos. S. Crane, Atty.

No. 723,979. PATENTED MAR. 31, 1903.
L. R. BLACKMORE.
REFRIGERATOR.
APPLICATION FILED MAR. 22, 1902.
NO MODEL. 6 SHEETS—SHEET 6.

Fig. 15.

Attest:
L. Lee.
Walter H. Talmage.

Inventor.
Lawrence R. Blackmore,
per Thos. S. Crane, Atty.

UNITED STATES PATENT OFFICE.

LAWRENCE R. BLACKMORE, OF ARLINGTON, NEW JERSEY.

REFRIGERATOR.

SPECIFICATION forming part of Letters Patent No. 723,979, dated March 31, 1903.

Application filed March 22, 1902. Serial No. 99,463. (No model.)

*To all whom it may concern:*

Be it known that I, LAWRENCE R. BLACKMORE, a subject of the King of Great Britain, residing at 101 Pleasant Place, Arlington, State of New Jersey, have invented certain new and useful Improvements in Systems of Construction for Refrigerators, fully described and represented in the following specification and the accompanying drawings, forming a part of the same.

The object of the present invention is to furnish a means of constructing a refrigerator of absolutely hygienic character and also to facilitate the making and assembling of the parts to form the completed article. The refrigerator is made hygienic by forming the whole construction of glass or earthen tiles secured to a suitable metal frame by cement or bolts, and the construction is facilitated by combining a series of expanded-metal panels with a skeleton metal frame and attaching the tiles to metal lath upon such panels by cement or bolts or a combination of cement and bolts. The wall of the refrigerator is made hollow by forming the panels of expanded or corrugated sheet metal, having the metal lath secured upon its opposite surfaces. The lath readily retains a layer of cement, by which the tiles are held in place, and the cement is, if desired, prevented from crowding into the chamber between the lath by applying a layer of fabric, as paper or felt, to the surface of the corrugated or expanded metal before securing the lath thereto. The lath is readily secured to such frame and expanded-metal panels by small clamps or by tying it thereto with wires threaded back and forth from opposite sides of the panel and frame.

Where the refrigerator is designed to be movable, the frame is preferably made of light metal, as T-bars and angle-bars of steel or iron, and the panels of expanded metal are readily secured between the bars of such frame by securing a channel-bar or trough-shaped bar to the edges of the expanded metal and bolting or riveting such marginal bar of the panel to the frame-bars. Any inner wall of the refrigerator-chambers may be formed of single glass tiles or plates cemented thereto between concave tiles secured in the corners of the chambers.

To avoid the absorption of vapors, which tends to foul the refrigerator, the door-openings and doors are provided upon the edges with molded glass tiles, and one of the contiguous surfaces is formed with a groove or recess to retain a buffer of elastic material to soften the contact of the parts as the door is closed. The inner side of the refrigerator is preferably lined with the vitreous tiles, and the exterior may be wholly covered with such tiles or all of the sides except the bottom and rear, which may be covered with a suitable plastering finished upon its outer side with a waterproof coating of wax or varnish. A portable refrigerator would have metallic plates attached to the frame at the corners or over the whole bottom, and the casters secured upon such plates are provided with a yielding seat containing a rubber or metallic spring to soften the jar of the casters in moving the refrigerator. Where the refrigerator is framed into a building or made stationary, as for butchers' use and storage purposes, the frame may be made of wood and the metal panels supported thereon and the tiling finished according to my invention.

The invention will be understood by reference to the annexed drawings, in which—

Fig. 3 is a horizontal section on line 3 3 in Fig. 2 with the ice and its supporting-platform omitted, the view being drawn upon a scale nearly twice as large in Fig. 1. Fig. 3ª is a vertical section of the top of the partition B. Figs. 4 to 9 are upon a scale nearly three times as great as Fig. 1.

Figure 1:
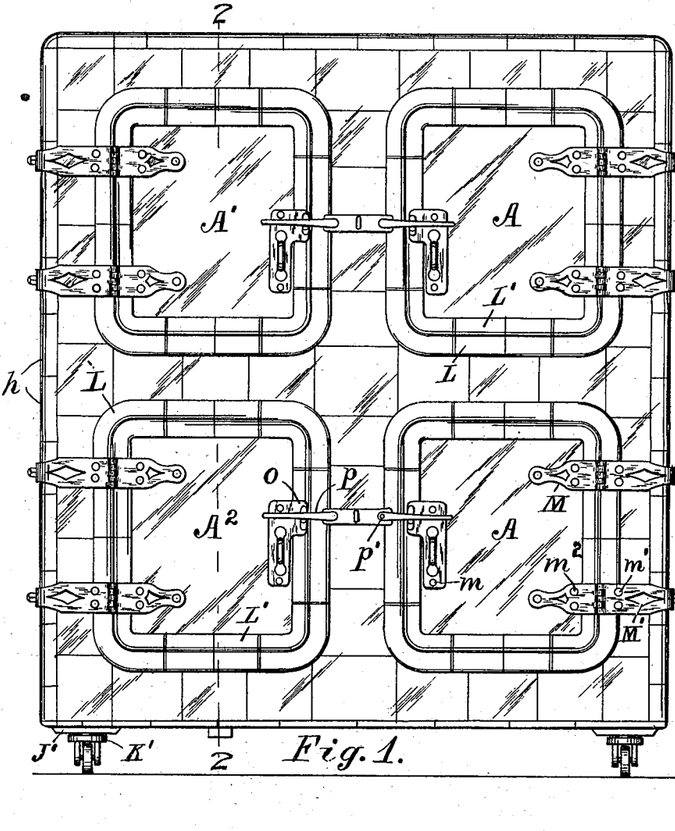
Figure 1 is a front elevation, and Fig. 2 a section on line 2 2 in Fig. 1.
Figure 2:
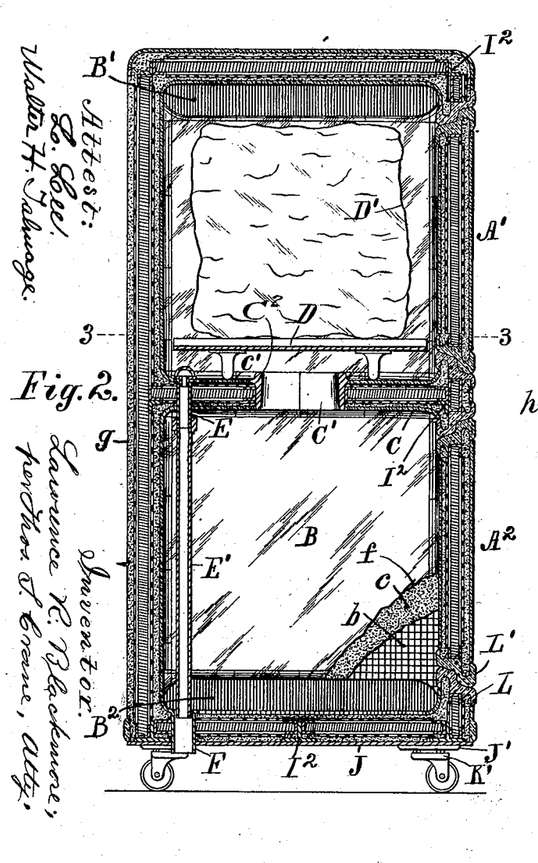
Figures 3, 3A:
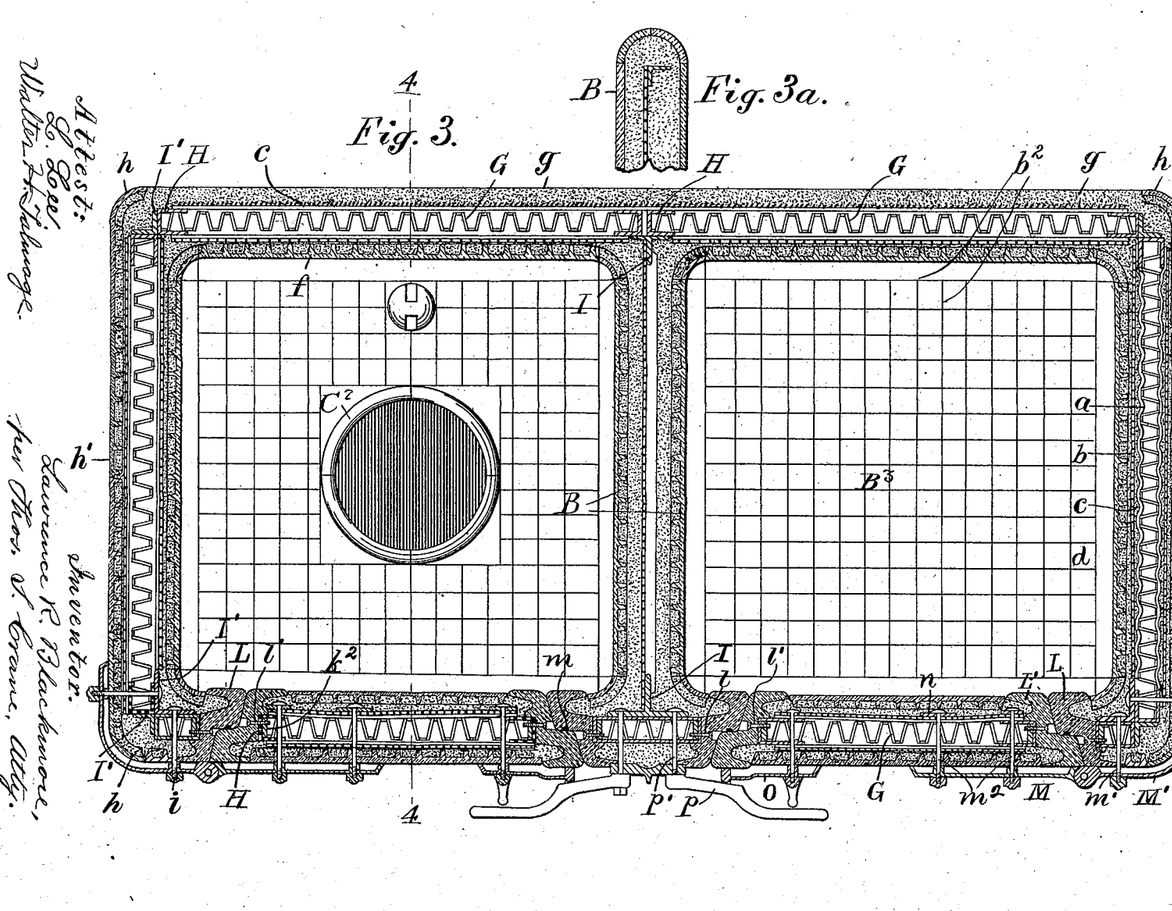

Figs. 1, 2, and 3 show a refrigerator with four doors A A' A² upon the front, the two doors A at the right opening into a single chamber which extends from the top to the bottom of the refrigerator. A vertical partition B is shown in the middle of the refrigerator, with ventilating-passages B' and B² at the top and bottom, and a horizontal partition C divides the space at the left of the partition B into upper and lower chambers, reached, respectively, through the doors A' and A². A central air-hole C' is shown in partition C, and a platform D is shown resting upon the partition with a block of ice D' thereon. The opening C' is bordered by tiles C², which extend sufficiently above the partition C to throw all the water to an outlet-pipe E, which is secured in the partition C and connects with a drain-pipe E' and an outlet F in the bottom of the refrigerator. In Fig. 3 the walls and frames of the doors are shown formed with air-chambers by the use of expanded-metal sections G, having channel-bars H secured upon the edges and overlapped at the corners, where they are riveted together, Fig. 6. Galvanized iron is used in this construction, and the plates of the channel-bars which lap on the sides of the sections are soldered thereto, the whole forming a very stiff panel. Such panels are secured by suitable bolts $i$ to vertical frame-bars I I' and horizontal frame-bars I², which are shown of angle or T form. (See Figs. 3 and 5.) The bottom of the refrigerator is shown formed with metal plate J in Figs. 2 and 5; but the bottom may be constructed like the other sides of the refrigerator and the framing provided with corner-plates J² to support the feet or caster-wheels.

Figure 10:
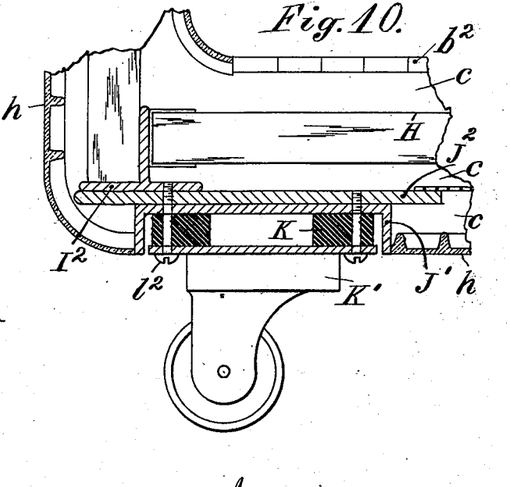
Fig. 10 is a vertical section of the caster-support for the refrigerator.

In Fig. 10 a socket J' is shown attached to the corner-plate J², and a spring K (represented as an annular india-rubber cushion) is shown in such socket beneath the foot of the supporting-wheel. The foot is secured upon the rubber spring by bolts $l^2$, and the refrigerator is thus preserved from jars when rolled upon its wheels.

The inner edges of the door-openings are faced with molded tiles L, formed in sections and secured to the panels or frame around such door-openings by bolts $l$, Fig. 3. The frame of each door is shown in Figs. 2 and 3 formed of a panel or section G of the expanded metal, and molded tiles L' are secured upon the edges of the door by bolts $l'$, extended into the edge of the panel. A reinforcing strip or plate $k^2$ is shown in each edge of the panel for the insertion of such bolts, and the heads of the bolts are counter-sunk in recesses formed in the tiles. The tiles L L' are beveled and rabbeted to form the usual close joint for a refrigerator-door, and Fig. 3 shows a buffer-strip $m$ inserted in a dovetail groove in the tiles L upon the shoulder where the tiles contact in closing the door to make a tight joint.

Figure 7:
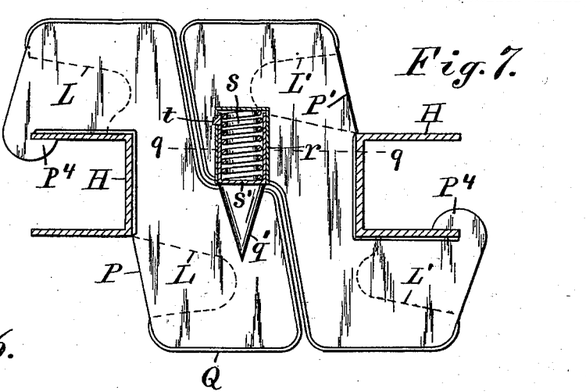
Fig. 7 is a plan of the tiles upon the edge of the door with a joint-plate for the tiles and a buffer formed thereon.
Figure 8:
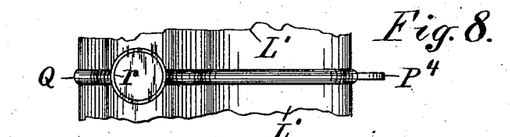
Fig. 8 is a front view of the tile-joint shown in Fig. 7.
Figure 9:
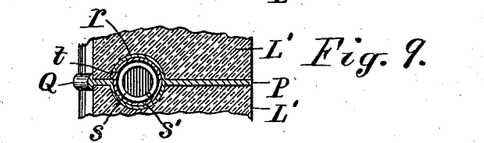
Fig. 9 is a section on line 9 9 in Fig. 7.

In addition to the strip $m$ the door may be cushioned at intervals by springs $s$, sustained in joint-plates P between the tiles, as shown in Figs. 7 to 9, inclusive. The joint-plates upon the door-opening are shown in Fig. 7 and cover the ends of the tile sections which line the edges of the door-opening, and each is formed with a hook P⁴ to engage the edge of the channel-bar H upon the adjacent panel. A bead or marginal rib Q is shown upon the edge of the joint-plate P to lap over the adjacent ends of the tiles L and lock them together and to the channel-bar, and a narrow flange can be formed upon the plate where it contacts with the channel-bar H to hold the tiles a short distance therefrom, which admits cement between the adjacent surfaces. A boss $q'$ is shown formed upon the plate to receive the pressure of the spring $s$, which is sustained in a socket $r$, formed upon a similar plate P' between the tile sections which border the door. The adjacent ends of the tile sections are suitably recessed to admit the boss $q'$ and the socket $r$. The spring is covered by a cap $s'$, which is held in place by a pin $t$, fitted to a slot in the side of the socket $r$, and the pressure of the boss $q'$ upon the cap brings the door gradually to rest upon its seat.

Figure 4:
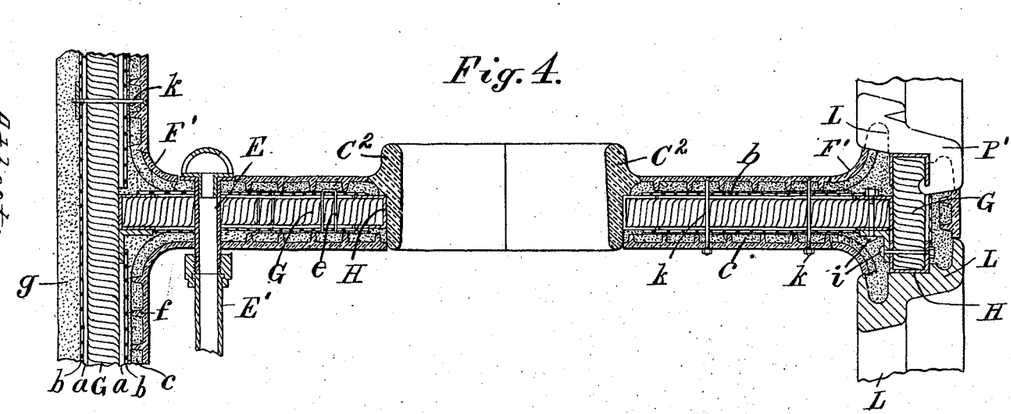
Fig. 4 is a section of the horizontal partition on line 4 4 in Fig. 3.
Figure 14:
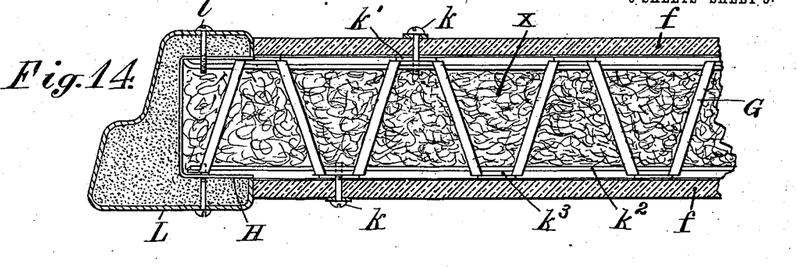
Fig. 14 is a transverse section showing portion of the refrigerator-wall with tiles secured to expanded metal by bolts.

The attachment of the tiles to the frame may be effected by bolts $k$, as shown in Fig. 14, by cement, as shown upon the sides and top of Fig. 3, or by bolts and cement combined, as shown upon the partitions in Figs. 2 and 4 and the front of the refrigerator in Fig. 3.

Figure 11:
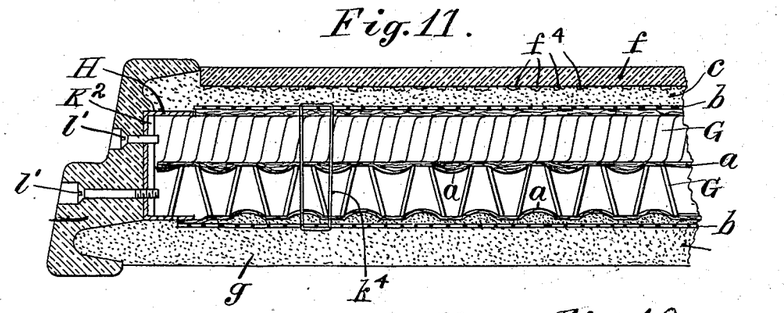
Fig. 11 is a section showing portion of a refrigerator-wall with panel formed of two-layers of expanded metal transversely to one another.

Fig. 14 shows the tiles perforated for bolts $k$ and attached with the intervention of yielding washer $k'$, applied to the opposite sides of an expanded-metal section G. A metal strip $k^2$ is shown inserted within the longitudinal ridges K³ of the expanded metal to receive the points of the bolts K. In Fig. 11 the channel-bar H is shown upon one end of the section G, and a section of the door-tile L is shown attached to the same by bolts $l'$, tapped into the reinforcing-bar K².

With the construction shown at the right-hand side of Fig. 3 a layer of felt $a$ is shown upon the opposite surfaces of the expanded metal G, and a metal lath $b$ is shown secured over the same, and cement $c$ is shown applied to the lath and tiles attached thereto.

Figure 5:
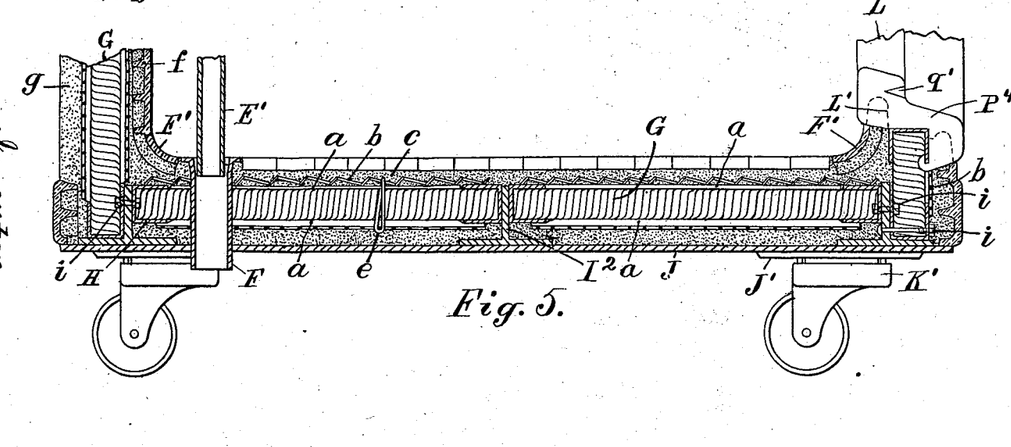
Fig. 5 is a section of the refrigerator-bottom on the same line 4 4 in Fig. 3.

The metal lath may be formed of perforated sheet metal, as shown in Fig. 3, of wire-netting, as shown in the lower right-hand corner of Fig. 2, where the tile and cement are broken away to expose the same, or of expanded metal, as shown at $b$ upon the upper side of the section G in Fig. 5.

Felt or paper is interposed, if desired, between the section G and metal lath to prevent the cement which is plastered upon the metal lath from filling the hollow space in the section G, and the cement when crowded through the metal lath tends in some degree to crowd the felt, paper, or other yielding fabric between the adjacent ridges of the expanded metal in the section G, as is shown at the right-hand side of Fig. 3. In the other parts of Fig. 3 such crowding of the yielding fabric into the spaces of the section G is not shown, as it is only incidental and not material to the construction. The metal lath may be readily secured to one or both sides of the section G, as may be required, by loops of wire $e$ (shown in Figs. 4 and 5) where the section is large enough to admit of their exhibition, and any other suitable means may be employed to give the lath a suitable attachment to the panel or section to support the tiles firmly thereon.

Figs. 2 and 3 show the ice-chamber having the hole C' in the bottom, and the aperture in the partition C to provide such hole is made square and four tiles $C^2$ fitted to the corners of such aperture to form the round opening C'. The ice-chamber, the provision-chamber below it, and the chamber $B^3$ at the right of the partition B are all lined in the corners with concave tiles F', and large rectangular tiles $f$ are fitted between such corner-tiles, one to each side of the chamber, thus avoiding as much as possible the exposure of cement joints in the chamber. The top and bottom of the partition B are formed with convex tiles, as shown in Fig. $3^a$. The bottom of the chamber $B^3$ on the right-hand side of partition B is shown paved with small square tiles $b^2$. The exterior of the refrigerator is shown provided upon the corners with convex angle-tiles $h$ and the flat surfaces in between such tiles covered with sectional tiles $h'$ of suitable size to closely fit between the same.

The back of the refrigerator is shown in Fig. 3 unprovided with tiles upon the exterior; but a heavy plastering $g$ is applied to the metal lath, which may be finished upon its outer side with waterproof coating of any suitable material to give it an ornamental appearance. A suitable plastering may be formed of calcined magnesite and chlorid of magnesia or chlorid of calcium and epsom-salt mother-liquor mixed with a body of asbestos-flour, sawdust, or coarse marble-chips. Such plastering becomes very hard and after its surface is rubbed smooth may be waxed or coated with waterproof varnish to give it an ornamental appearance. Such a plastering may, if desired, be applied to the entire exterior of the refrigerator, except the edges of the doors and door-openings, which are liable to absorb vapors from the contents of the refrigerator. I have, however, claimed such construction for any surface of the refrigerator, although I consider the vitreous tiles most durable for the lining of the interior chamber or chambers and for the margin of the door-opening and door.

Figure 13:
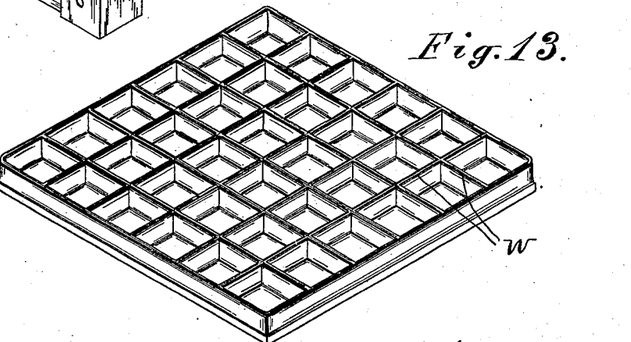
Fig. 13 is a perspective view showing the intersecting ribs upon one of the tiles.

A very durable cement which does not absorb moisture to any appreciable degree where exposed in the joints of the tiles may be made (for attaching the tiles upon the interior of the refrigerator) by mixing soluble glass with powdered mineral, as asbestos, mica, glass, or marble. Such mineral is pulverized and made into a cement with the soluble glass and applied simultaneously to the inner surface of the tile and to the surface of the lath upon which it is to be secured. The tiles, as shown in Fig. 13, are preferably formed upon the back with intersecting ribs $w$, and the cement when pressed in between such ribs adheres strongly thereto, and when the tile thus prepared is pressed upon the cement on the lath it is firmly secured thereon. Glass adheres strongly to such cement, and where the tile is formed of large sections to form the whole side of one of the chambers plate-glass may be used without any ribs, although I prefer in most cases to use glass tiles with the ribs $w$ formed thereon by pressing in a mold.

The doors are shown provided in Figs. 1 and 3 with hinges M, the bases M' of which are preferably extended around the corners of the exterior and secured on the same by bolts $m'$. The hinge-straps are shown secured to the door by bolts $m^2$, extended through the expanded-metal panel G and through the lathing upon its farther side, upon which a large plate-washer $n$ is shown, to distribute the strain. The ordinary wedge-seat $o$ is shown fastened upon the door, and a wedge-lever $p$ is shown pivoted upon the door-jamb by a bolt $p'$, which is attached to the panel between the right-hand and left-hand doors, and any other fastenings may be attached to the door and door-jamb by suitable means.

The bottom of the refrigerator is shown with the metal plate J; but the corners alone at the bottom may be provided with such plates attached to the frame-bars I' and the remainder of the bottom covered with tiles or plastering, if preferred. Fig. 10 shows a corner-plate $J^2$ with a metal socket J' thereon, containing the spring-cushion K, upon which the foot K' of the caster is held by bolts $l^2$. A rubber spring is shown; but an elliptic, a spiral, or any other suitable spring may be used, and such cushions protect the refrigerator in great degree from the jars transmitted to the casters when moved over a rough surface. My construction involves in most cases the use of the expanded metal to form panels for the support of the tiles, which may be attached to such panels by any of the means shown herein.

Tiles have heretofore been attached directly to woodwork in refrigerator constructions; but the wood is not only liable to warp and affect the joints of the tiles, but it absorbs the vapors which escape through the joints of the tiles and perceptibly affects the atmosphere in the refrigerator-chamber.

Figure 12:
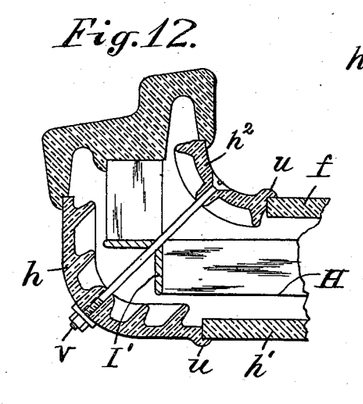
Fig. 12 shows a detail of the corner-tiles and their connections.

In forming a stationary refrigerator by my invention a wooden frame may be used; but the panels of expanded metal are used, which may be made of any desired dimensions, as they possess great stiffness when provided with the channel-bars at the border, and the tiles when secured thereon are not affected by any warping of the structure nor liable to have their joints displaced. In making large panels the required stiffness may be obtained, as shown in Fig. 11, by extending two layers of the deeply-expanded metal in opposite directions, so that the ridges of the expanded metal run in opposite directions in the two layers, the layers being secured together by wire loops $k^4$, extended through metal lathing or washer-plates applied to its opposite surfaces. Layers of felt $a$ are shown interposed between the two layers of expanded metal and between the metal lathing and the expanded metal to form a closer contact of the parts. The channel H is shown in Fig. 11 upon the end of the section with the reinforcing-piece $k^2$ inserted inside the same for the attachment of screws $l$, as shown in Fig. 3. Fig. 12 shows a modification by which the corner-tiles $h^2$ and $h$ upon the inner and outer sides of the wall are provided with overlapping flanges $u$ to cover the edges of the side tiles $h'$ or $f$, thus preventing such side tiles from displacement and preventing anything from reaching or affecting the cement in the joint. The corner-tiles are shown each with bolts $v$ extended from the inner to the outer side of the wall and passing through one of the corner frame-posts $I'$.

Figure 6:
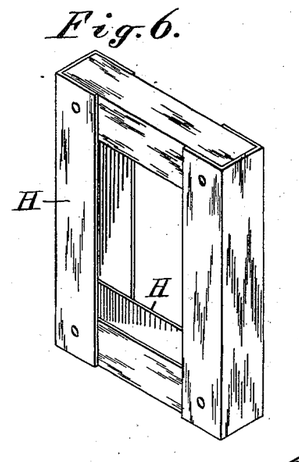
Fig. 6 is a perspective view of the channel-bars for one panel-frame.

The channel-bars of the frames H are in practice made of galvanized sheet metal bent into trough shape and formed so that the bars upon two sides fit at the corners over the bars upon the other two sides, as shown in Fig. 6, and such channel-bars may when required be perforated to secure the attachment of the cement thereon. Such perforation is shown in the channel-bars of the door $A'$ in Fig. 3 and in one of the adjacent channel-bars and in the channel-bar at the left-hand side of Fig. 11 and may be employed in all the channel-bars, although only a portion of the surfaces of such bars may be exposed to the cement. The expanded metal (shown in Fig. 3) presents a zigzag outline like a section of corrugated metal, and plain corrugated metal would be an equivalent to such expanded metal for sustaining the metal lath and forming an air-chamber, although such corrugated metal would not be so light as the expanded metal shown. I have, however, used the term "corrugated metal" in the claims to include metal having a zigzag cross-section whether the same be solid or slit, as is the case when expanded metal is employed.

Figure 15:
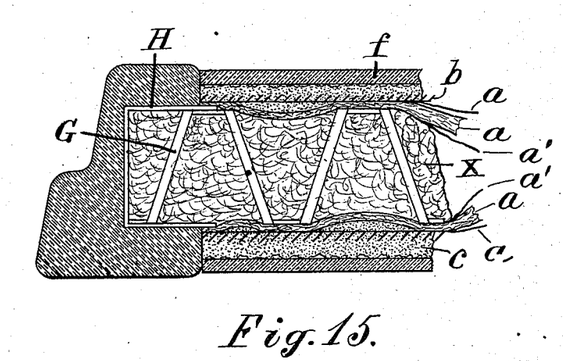
Fig. 15 is a transverse section showing portion of a refrigerator-wall with tiles secured upon cement, and felt and paper inserted between the lathing and the expanded-metal panel.

In Fig. 15 the wall is shown formed upon a panel made of a single sheet of expanded metal, with paper $a'$ applied to opposite sides of the expanded metal and a layer of felt over such paper, to the surface of which felt the expanded metal would be secured, as already described, by wiring through the panel.

A layer of waterproof paper with or without a layer of felt applied next the corrugated metal performs the double function of protecting the corrugated metal (which forms the body of the panel) from the cement, which is moist when first applied, and also of forming a non-conductive coating to the chamber within the panel and confining the air thereto. Where a layer of felt is used, it is preferably applied between two layers of waterproof paper, which with the felt forms a non-conducting fabric of suitable character for the purpose. The inner space of the panel may be filled with a non-absorptive filling, such as the mineral wool X shown in Figs. 14 and 15, and the use of such filling with the mineral character of all the other elements precluding the absorption of water or any molding of the parts. The cheap felt adapted for use in such constructions is of very loose texture, and as only a thin layer is requisite it is in practice used between layers of waterproof paper $a'$, as indicated in Fig. 15. The composite layer of felt and paper is shown crowded a little between the adjacent ridges of the expanded metal toward the filling X of non-conducting material, the cement which is forced into the sheet-metal lath filling the space between the lath and such curved portion of the felt. Where the composite layer is thus crowded inwardly, the paper is represented by the black lines at the opposite sides of the layer and the felt is represented by the layer of hair which is delineated between such lines; but the layers of paper and felt are separated at one end to distinguish them and show their appearance before they are compressed together.

Upon the upper side of the construction shown in Fig. 11 the tile $f$ is represented with uneven projections $f^4$ upon its inner side embedded in the cement to form a greater adhesive surface; but in most cases the tiles if applied to the exterior of the refrigerator would be provided with the intersecting ribs $w$, (shown in Fig. 13,) which hold the tiles more securely from displacement.

Having thus set forth the nature of the invention, what is claimed herein is—

1. In a refrigerator, the combination, with a suitable frame having metallic lath secured thereon forming an internal chamber and cement applied to such metallic lath, of a single glass plate or tile forming an entire wall of the chamber, except at the corners, and attached to the lath by the cement, and corner-tiles fitted to the cement and having the flanges $u$ overlapping the edges of the said plate, to cover the joint.

2. In a refrigerator, the combination, with a suitable frame having metallic lath secured thereon forming an internal chamber and cement applied to such metallic lath, of a single glass plate or tile forming an entire wall of the chamber, except at the corners, and attached to the lath by the cement, and corner-tiles fitted to the cement and having the flanges $u$ overlapping the edges of the said plate, with a bolt extended through each corner-tile to secure it in place.

3. In a refrigerator, the combination, with a skeleton metallic frame, of panels of expanded metal having channel-bar frame around the edges adapted to fit between the skeleton frame-bars, means for attaching the channel-bar frames to the skeleton frame-bars, and metallic lath secured upon such panels, with tiles attached thereto by cement.

4. In a refrigerator, the combination, with a skeleton metallic frame, of panels of expanded metal having channel-bar frame around the edges, means for attaching the channel-bar frames to the skeleton frame-bars, metallic lath secured upon such panels, cement applied to the lath, and glass tiles having intersecting thin ribs upon the inner side embedded in the cement.

5. In a refrigerator, the combination, with a skeleton metallic frame, of panels of expanded metal having channel-bar frame around the edges, means for attaching the channel-bar frames to the skeleton frame-bars, a non-heat conductor, as mineral wool, applied to the interspaces of the expanded metal, metallic lath secured upon such panels, cement applied to the lath, and tiles secured upon the lath by the cement.

6. In a refrigerator, the combination, with a skeleton metallic frame, of panels of expanded metal having channel-bar frame around the edges, means for attaching the channel-bar frames to the skeleton frame-bars, metallic lath secured upon such panels with tiles attached thereto by cement, and bolts inserted into the panels at intervals to reinforce the attachment of the tiles to the panels.

7. In a refrigerator, the combination, with a skeleton metallic frame, of panels of expanded metal having channel-bar frame around the edges adapted to fit between the skeleton frame-bars, metallic lath secured upon such panels with tiles attached thereto by cement, a reinforcing-strip inserted within the panel, and bolts inserted through the tiles into the panel to engage such reinforcing-strip, substantially as herein set forth.

8. In a refrigerator, the combination, with a skeleton metallic frame, of panels of expanded metal having channel-bar frame around the edges, a layer of non-conducting fabric formed of felt between two layers of waterproof paper upon opposite sides of the panel, metallic lath secured over such layer, and tiles attached to the metallic lath by cement.

9. In a refrigerator, the combination, with a skeleton metallic frame, of panels of expanded metal having channel-bar frame around the edges adapted to fit between the skeleton frame-bars, means for attaching the channel-bar frames to the skeleton frame-bars, metallic lath attached to the inner sides of the panel surrounding the refrigerator-chamber, cement applied to the lath, corner-tiles secured by the cement in the corners of the chamber, and each wall of the chamber between such corner-tiles formed of a single glass plate or tile attached to the cement.

10. In a refrigerator, a frame having door-opening with molded glass tiles secured upon its inner edge to form a joint with the door, in combination with a door having molded glass tiles secured upon its edge.

11. In a refrigerator, the combination, with a suitable frame having a door-opening with molded glass tiles upon its inner edge, of a door-frame having correspondingly molded glass tiles upon its edges to make a joint with those upon the door-opening, and bolts and cement for securing the said joint-tiles in place.

12. In a refrigerator, the combination, with a frame having door-opening with molded glass tiles upon its inner edge, of a door-frame having corresponding molded glass tiles upon its edge to form a joint with those of the door-frame, bolts to attach the tiles to their respective frames, and joint-plates extended between the joints of the said molded tiles and secured to the frame within said tiles, and engaged with the tiles to lock them to the frame.

13. In a refrigerator, the combination, with a frame having door-opening with molded glass tiles upon its inner edge, of a door-frame having corresponding molded glass tiles upon its edge to form a joint with those of the door-frame, bolts to attach the tiles to their respective frames, and joint-plates extended between the joints of the said molded tiles and secured to the frame within said tiles, and having a socket to hold an elastic buffer to soften the concussion of the door.

14. In a refrigerator, a frame having door-opening with molded glass tiles secured upon its inner edge to form a joint with the door, in combination with a door having molded glass tiles secured upon its edge, the tiles of the door-frame and door being rabbeted to bear upon one another, and one of the contiguous surfaces having a dovetailed groove formed therein, with a buffer-strip secured in such dovetailed groove to make a tight joint.

15. A refrigerator formed of metallic framing, layers of cement upon the inner and outer sides of the framing, tiles attached by such cement to cover the interior and exterior of the structure, the tiles around the margin of the door-frame being formed with rabbet as set forth, and a door formed of metal framing having tiles secured thereon by cement and the tiles upon the edge being molded to match those of the door-frame, and the door being hinged to the door-frame, substantially as herein set forth.

16. In a refrigerator, the combination, with a skeleton metallic frame, of panels of expanded metal having channel-bar frame around the edges adapted to fit between the skeleton frame-bars, means for attaching the channel-bar frames to the skeleton frame-bars, metallic lath attached to the inner and outer sides of the frame, cement applied to the interior of the metallic lath with tiles secured thereby to line the chamber of the refrigerator, and magnesite plastering having a body of thickening material applied to the exterior lath, and furnished with a waterproof coating, as and for the purpose set forth.

In testimony whereof I have hereunto set my hand in the presence of two subscribing witnesses.

LAWRENCE R. BLACKMORE.

Witnesses:
L. LEE,
THOMAS S. CRANE.